United States Patent Office 3,284,489
Patented Nov. 8, 1966

3,284,489
CALCIUM MONO-GLYCINE ACETYLSALICYLATE
Alexander Galat, 126 Buckingham Road, Yonkers, N.Y.
No Drawing. Filed Aug. 13, 1962, Ser. No. 216,294
1 Claim. (Cl. 260—480)

This application is a continuation-in-part of my copending application filed April 24, 1962, Serial Number 189,680, for Method For Preparing Stable, Water Soluble Acetylsalicylic Acid Derivatives and Compounds Prepared Therefrom, now abandoned, which is in turn a continuation-in-part of an application filed August 28, 1959, Serial Number 836,617, now abandoned.

The present invention relates to a new derivative of acetylsalicylic acid and to a method for preparing the same.

As is well known, acetylsalicylic acid (aspirin) is an effective antipyretic and analgesic of low toxicity. Aspirin is commonly administered in the form of tablets or capsules but quite frequently it would be desirable to administer this drug in the form of a clear, aqueous solution, especially to patients unable or unwilling to take tablets or capsules, such as infants, small children and elderly people. It would also be very desirable to administer aspirin by injection in those instances where prompt and direct action is necessary, such as in emergencies where very high fever or delirium or loss of consciousness make other routes of administration too slow, ineffective or impossible.

Because of the low solubility of aspirin in water and the inability of the prior art to produce a stable, water soluble derivative of aspirin, administration of an aqueous solution of this valuable drug either orally or by injection has not been possible.

Since acetylsalicylic acid forms water soluble salts with practically all organic and inorganic bases, the prior art has largely concerned itself with the preparation of such salts by reacting aspirin with hydroxides and carbonates of the alkali metals and the alkaline earth metals and with various organic bases. A number of such salts have made a brief commercial appearance, for example, sodium acetylsalicylate (hydropyrin), lithium acetylsalicylate (litmopyrin), calcium acetylsalicylate ("aspirin soluble"), magnesium acetylsalicylate (magnespirin) and the like. However, they were soon withdrawn from commerce when it became evident that these salts were unstable. When freshly prepared these salts (like aspirin itself) give no color with ferric salts, but after storage for a short time these salts (but not aspirin) give the typical color reaction with ferric salts characteristic of the free phenolic group. While aspirin itself is stable on storage, even for protracted periods, the salts thereof are rapidly self-hydrolyzing with the production of salicylic acid. This decomposition is accompanied by the release of acetic acid which manifests itself by the appearance of a strong odor of acetic acid and a considerable rise in acidity. For example, after storage for only five days at 37° C. magnesium acetylsalicylate is completely decomposed while the calcium salt is completely decomposed after two weeks storage at the temperature given. Because of this decomposition, the therapeutic effect of aspirin is lost while the irritating side effects of the decomposition products (salicylic and acetic acids) on the gastrointestinal mucosa become prominent. For these reasons, use of these salts in medicine was discontinued as soon as their lack of stability became evident.

While aspirin can be considered sufficiently stable for practical purposes under normal conditions of storage it is otherwise a rather sensitive and labile compound. Aspirin is readily hydrolyzed by aqueous solvents with the liberation of salicylic and acetic acids. Acids accelerate the rate of this hydrolysis. Aspirin cannot be purified by crystallization from water or solvents containing water because of this hydrolysis.

Thus, aspirin itself and known derivatives thereof are not particularly stable materials and as a corollary of this instability, aspirin is incompatible with many materials having a tendency to accelerate hydrolytic decomposition of aspirin. Among materials that are incompatible with aspirin may be mentioned salol, acetanilid, acetophenetidine, aminopyrine, antipyrine, and many others.

Thus, an object of the present invention is to provide a stable, water soluble derivative of acetylsalicylic acid, calcium mono-glycine acetylsalicylate.

A further object of the present invention is to provide a method for the separation of the reaction product calcium mono-glycine acetylsalicylate from the reaction media or system.

One object of the present invention is to provide a derivative of acetylsalicylic acid that is stable over protracted periods.

A further object of this invention is to provide the compound calcium mono-glycine acetylsalicylate exhibiting a high solubility in water.

Another object of this invention is to provide the compound calcium mono-glycine acetylsalicylate that is stable over protracted periods.

Additional objects of this invention will become apparent as the description thereof proceeds.

At this point definitions will be given covering the meaning of the terms "stable over protracted periods" and "high solubility in water" as these terms are used in the present application.

It is generally agreed that a commonly used drug, such as aspirin, should be stable for at least twelve months when stored at room temperature and herein the term "stable over protracted periods" refers to at least this degree of stability. As a numerical criterion for assessing the stability of aspirin and aspirin derivatives, if after twelve months storage at room temperature the material exhibits an acetylsalicylic acid assay within 5% of that of the material when freshly prepared, this represents a satisfactory degree of stability for all practical purposes and accordingly the material is to be considered as being "stable over protracted periods" as this term is used in the present application.

Many accelerated tests have been proposed for the rapid determination of room temperature storage stabilities. The correlation set forth in Chemistry & Industry, volume 54, page 805, 1935, has been frequently employed for the rapid assessment of storage stabilities. According to this correlation, storage for three weeks at 37° C. (98.6° F.) or for five days at 50° C. (122° F.) are each equivalent to twelve months storage at room temperature.

To be suitable for oral administration in the form of an aqueous solution or, even more particularly, for injection in the form of an aqueous solution, a drug should possess sufficient solubility to permit its usual therapeutic dose to be dissolved in about 2 ml. of water. With aspirin, where the usual therapeutic dose is 325 mg. (5 grains) this would require a minimum solubility of one part aspirin in 6.15 parts of water (325 mg. in 2 ml. of water. (For oral administration a somewhat lower solubility would be acceptable such as one part aspirin in 15 parts of water (325 mg. in 5 ml. of water, equivalent to a teaspoonful) or even one part in 30 to 50 parts of water.) The rate of dissolution should be rapid requiring, for example, no longer than 10–15 seconds. Also, the resulting solution should be perfectly clear and free from any insoluble matter.

Herein the term "high solubility in water" refers to the highest level of solubility specified in the previous paragraph (325 mg. in 2 ml. of water) coupled with a rate and completeness of dissolution conforming to the specific range and description given above. Furthermore, to be characterized as possessing "high solubility in water" a material must conform to all these specifications both when freshly prepared and after twelve months storage at room temperature.

In order to accomplish the objects of this invention, an acetylsalicylic acid derivative must meet all of the criteria with respect to stability, solubility, rate of dissolution and completeness of solution described above. Failure to meet one of these criteria results in a product that is either useless or of limited value at best.

It has been found that under certain critical reaction conditions to be set forth specifically hereinafter, one mole of the calcium salt of the acetylsalicylic acid reacts with one mole of glycine to form a new compound, calcium mono-glycine acetylsalicylate, which is anhydrous, non-hygroscopic and is stable over protracted periods and exhibits high and complete solubility in water and a rapid rate of dissolution.

Further, and unexpectedly, the compound of this invention is tasteless in solution. This property makes oral administration easier with children in pediatric preparations. Further, because of the lack of taste, adults and children more readily accept the compound of this invention, especially when a patient is sick and subject to vomiting.

Unexpectedly, it has been found that the compound of this invention is more effective at an equivalent dosage than aspirin as an analgesic and antipyretic.

The compound of this invention being neutral does not irritate the gastrointestinal mucosa. In patients with gastrointestinal diseases this is a highly important benefit.

It has been found that a stable water soluble derivative of acetylsalicylic acid can be prepared by reacting calcium actylsalicylate with glycine (aminoacetic acid) in a molar ration of 1:1 in a reaction system containing at least enough water to dissolve substantially all of the reactants and substantially all of the resulting reaction product and at least enough polar organic solvent to decrease the solubility of the reaction product to cause the product to crystallize from the reaction system. It has been found that the compound of this invention can be readily crystallized from the reaction system provided that certain critical relationships are observed in the solvent components in the reaction system.

The chemical structure of the compound of my invention is exemplified by the following formula:

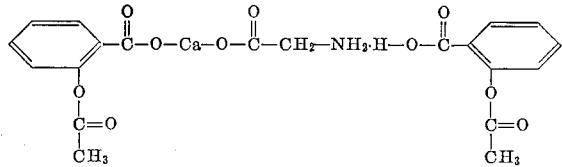

For the better understanding of this invention, Example 1 sets forth a specific illustrative but non-limiting procedure for the preparation of the compound of this invention.

*Example 1*

One mole (434 g.) of calcium acetylsalicylate hydrate was added to one mole (75 g.) of glycine dissolved in 2170 ml. of water. The process of dissolution of the two reactants is conveniently speeded up by using warm water, as for example at 50°. To the resulting solution was added 5420 ml. of isopropanol and the mixture allowed to stand in the refrigerator until the crystallization was complete (usually 24 hours). The crystals of the reaction product were filtered, washed with 85% isopropanol, followed by anhydrous isopropanol, then dried at room temperature, in vacuum over sulfuric acid. The yield was 390 g. (82.5%) of calcium mono-glycine acetylsalicylate.

The new compound may be recrystallized as follows: 100 g. of the product obtained as above described was dissolved in 500 ml. of water at about 40–50° and treated with 1.2 lit. of isopropanol. The mixture was allowed to stand in the refrigerator until the crystallization was complete (usually 24 hours), the crystals filtered, washed with 85% isopropanol, followed by anhydrous isopropanol and finally dried at room temperature, in vacuum over sulfuric acid. The yield was 85 g. (85%) of calcium mono-glycine acetylsalicylate.

The new compound calcium mono-glycine acetylsalicylate is anhydrous, non-hygroscopic and stable and has a melting point of 160–165° with decomposition at 170–175°. The nitrogen analysis gave 3.13%, while the calculated theoretical amount is 3.00%.

Calcium mono-glycine acetylsalicylate is soluble in water at room temperature to the extent of about 25 g. per 100 ml. of water. Since the acetylsalicylic acid content of the compound is 76%, its saturated solution contains the equivalent of about 20 g. of aspirin per 100 ml. of water. Since the solubility of aspirin itself is only about 0.3 g. in 100 ml. of water, the new compound permits a 70 fold higher solution concentration than is possible to achieve with aspirin itself.

Four hundred and twenty eight milligrams of the new compound, calcium mono-glycine acetylsalicylate, corresponding to 325 mg. or 5 grains of aspirin was added to 2 ml. of water. A clear solution formed almost immediately. This weight of the new compound was, of course also instantly soluble in larger amounts of water such as 5 ml. (teaspoonful), 15 ml. (tablespoonful) and the like. Thus the compound of this invention exhibits high solubility in water.

Calcium mono-glycine acetylsalicylate was found to be insoluble in ethanol, methylcellosolve, dioxane, propylene glycol, pyridine, chloroform and carbon tetrachloride.

The reactants calcium glycinate and acetylsalicylic acid may be used to produce the compounds of this invention. When these reactants are combined they will first form the reactants of Example 1, glycine and calcium acetylsalicylate. The method is then the same as in Example 1. When water is present the same kinds of ions are present whether calcium glycinate and acetylsalicylic acid or glycine and calcium acetylsalicylate are used.

In testing stability, 100 mg. of freshly prepared calcium mono-glycine acetylsalicylate was first analyzed for salicylic acid by dissolving in distilled water and adding a 1% solution of ferric ammonium sulfate, U.S.P. thereto. The color produced was compared to that of similarly treated solutions of salicylic acid of known concentrations. As an alternate method the salicylic acid content was determined by the U.V. spectrum. The freshly prepared material was found to contain 0.2 mg. (0.2%) salicylic acid. It was free of acetic acid odor. After three months storage at room temperature, the calcium mono-glycine acetylsalicylate was still free of acetic acid and the salicylic acid content did not rise above the original 0.2%. During room temperature storage under normal conditions of humidity the compound shows no increase in weight showing that it is nonhygroscopic.

The product was then subjected to accelerated testing procedures in which the drug was kept at elevated temperatures for a limited number of days to provide an estimate of its rate of decomposition at room temperature over much longer periods of time.

In one such test a sample of calcium mono-glycine acetylsalicylate was maintained for five days at 50° C. and analyzed at the end of this period. The salicylic acid content did not rise significantly, being only 0.3%. There was no formation of free acetic acid, as indicated by the absence of the characteristic sharp odor of it. The melting point of the resulting stored product had not changed, being 160–165° with decomposition at 170–175°, the same as that of the original material. The solubility of the aged product in water was complete and instantaneous as is characteristic of the original product. The solution of the aged product in water was acidified and the precipitated material believed to be pure aspirin was filtered, washed with water, and dried. This material had a melting point of 137–138° which was not depressed when it was mixed with an authentic sample of aspirin, U.S.P. and thus was pure aspirin. Thus the new compound, calcium mono-glycine acetylsalicylate, after a period of accelerated aging corresponding to 12 months storage at room temperature still contained aspirin in the most pure and uncontaminated condition.

After 12 months storage at room temperature, a sample of calcium mono-glycine acetylsalicylate was still free of acetic acid, was freely and completely soluble in water and had the salicylic acid content of .3%.

As has been shown above, calcium mono-glycine acetylsalicylate is obtained by reacting calcium acetylsalicylate and glycine in equimolar proportions and can be recovered in anhydrous, crystalline form and in good yield provided certain critical volume relationships of mixed solvents are observed. It has been found that by contacting or treating calcium acetylsalicylate with glycine with at least enough water to dissolve substantially all of the reactants and the reaction product and with at least enough organic solvent, preferably a polar organic solvent that is miscible with water, to depress or decrease the solubility of the reaction product to the point where it crystallizes from the solvent admixture, the stable, anhydrous, non-hygroscopic compound of this invention will then crystallize readily and in good yield from the solvent admixture.

Unexpectedly, it has been found that large quantities of water are desirable and essential in the process to produce the compounds of this invention. The prior art, particularly U.S. Patent 2,101,867 (Miller et al.) has logically taught that in view of the nature of the derivatives of acetylsalicylic acid, the less water used in the reaction, the less the resulting product will be in solution and consequently, less hydrolysis and decomposition of the product will take place, since only that small portion of the reaction product or salt that is in solution can actually hydrolyze.

In distinct contrast to this logical reasoning, it has been found that a stable non-hygroscopic, anhydrous compound of novel chemical structure, which is the object of this invention, is obtained only when substantially all of the reaction product is in solution prior to its isolation by crystallization.

With the process of the present invention, it has been found that a stable, anhydrous, non-hygroscopic compound can be obtained as long as at least prior to the isolation or separation of the reaction product from the reaction system the correct adjustment is made with respect to the amount of water and the polar organic solvent, respectively, that are utilized.

Thus, the adjustment can be made before, during or after the reaction between calcium acetylsalicylate and glycine is completed. For example, the reaction may be carried out under conditions such that the reaction product is first formed, then isolated in a crude form and finally subjected to the mixed solvent treatment of this invention. Alternatively, the reaction may be conducted in the presence of one or more solvents and upon completion of the reaction, the reaction medium then adjusted so that the correct volume relationship between the reaction product and the mixed solvents is carried out, causing the desired salt to be crystallized from the thus adjusted reaction medium.

Preferably, and contrary to the prior art teaching, it has been found that the entire reaction involving both the formation of the compound and its subsequent isolation is best carried out by taking the initial reactants, i.e. the calcium acetylsalicylate and glycine, introducing them into a reaction system containing at least enough water to dissolve substantially all of the reactants and substantially all of the reaction product and adding at least enough polar solvent to depress or decrease the solubility of the resulting reaction product (when formed) to cause it to crystallize in maximum yield from the reaction system. Upon completion of the reaction, the crystalline reaction product is then separated from the mother liquor by any convenient means, as by filtration, for example.

In carrying out the entire reaction in this preferred manner, the minimum amount of water is that quantity sufficient to dissolve substantially all of the calcium acetylsalicylate and glycine and to dissolve substantially all of the reaction product. However, the maximum amount of water permitted or tolerated must be below the amount required to prevent crystallization of the reaction product from the solvent admixture. Likewise, the minimum amount of polar organic solvent required is that amount that will effectively decrease or depress the solubility of the reaction product in the reaction system to cause or permit crystallization of the reaction product to occur. When the reaction is conducted in this manner, the crystals of the desired compound soon appear and upon cooling of the reaction system the crystallization is soon completed in good yield.

The preferred organic solvents are polar solvents, especially those miscible with water. Such solvents as methanol, isopropanol, ethanol, acetone, dioxane, dimethylsulfoxide, dimethylformamide, 1,4-dioxane and the like have proven satisfactory. Other operable solvents include dimethylacetamide, tetrahydrofuran, tetrahydrofurfuryl alcohol, propylene glycol and methylcellosolve. Especially preferred are the monohydric alcohols that are water miscible.

The total quantity of the solvent admixture is preferably from 5 ml. to about 15 ml. of the mixed water-polar organic solvent per gram of the mixture of reactants. The reaction involving the formation of the product of this invention is usually carried out at about room temperature. Where the solvent mixture is to be used either to adjust the conditions of the reaction system in which the calcium monoglycine acetylsalicylate has already been formed or to improve the degree of purity of this compound that has already been isolated, then preferably between about 5 ml. and about 15 ml. of the mixed solvent per gram of the crude reaction product subject to recrystallization are, of course, employed.

In contrast, the prior art procedures as exemplified in U.S. Patent 2,101,867 use excedingly small total quantities of solvent. The preferred range in this invention of about 5 ml. to about 15 ml. per gram of reaction product is in the order of 30 to 90 times the total amount of solvent taught in U.S. Patent 2,101,867.

While it has been shown that the total amounts of mixed solvent of between about 5 ml. and about 15 ml. per gram of reaction product are generally sufficient to maintain the critical relationships discussed above that are required in order to permit crystallization in good yield of the reaction product from the reaction system, it has been demonstrated that somewhat lower amounts of mixed solvent can be employed if slightly higher temperatures of reaction are used. For example, the calcium acetylsalicylate and the glycine are more soluble in warm water, i.e. up to 50°, so that lower amounts of water can be used where the product forming reaction is to be conducted at temperatures above room temperature. However, temperatures in excess of 50° are to be avoided in order to obviate the danger of hydrolysis occurring in the reaction product. In any event, the crystallizing out of the compound, when formed, is preferably conducted at lower temperatures, e.g. 0–25° C.

To insure that the product is of sufficient purity to be anhydrous and non-hygroscopic and accordingly of the degree of stabiilty required to achieve the object of the present invention it is advisable to subject the crystals of the compound as recovered from the reaction medium to a recrystallization procedure. A solvent mixture of the nature set forth above is employed for this purpose and the considerations outlined previously also dictate the preferred composition range and quantity of the solvent mixture employed for recrystallization of the crude reaction product. Thus sufficient water is used to provide a solution of the calcium mono-glycine acetylsalicylate and the proper quantity of water miscible organic solvent must be employed to result in the separation of the greater part of the compound as crystals on cooling the recrystallization solvent mixture.

By following these reaction conditions a new chemical compound, calcium mono-glycine acetylsalicylate, is formed which differs from compounds of the prior art in its chemical composition and structure and its physical and chemical properties.

As shown above, the new compound comprises one mole of glycine per mole of calcium acetylsalicylate, or, since the latter consists of two moles of acetylsalicylic acid, the compound of this invention contains half a mole of glycine per mole of acetylsalicylic acid. The compound of the prior art, described in the U.S. Patent 2,101,867 is calcium di-glycine acetylsalicylate, consisting of two moles of glycine and one mole of calcium acetylsalicylate. Thus, this compound contains one mole of glycine per mole of acetylsalicylic acid.

The following example shows that under the conditions of my process the use of 1:2 mole ratio of reactants (as used by Miller) still results in the formation of the monoglycine compound of my invention:

*Example 2*

One mole (434 g.) of calcium acetylsalicylate hydrate was added to two moles (150 g.) of glycine dissolved in 2170 ml. of water. The process of dissolution of the reactants is conveniently speeded up by using warm water as for example at 50°. To the resulting solution was added 870 ml. of isopropanol and the mixture was allowed to stand in the refrigerator until the crystallization was complete (usually 24 hours). The crystals of the reaction product were filtered, washed with 85% isopropanol, followed by anhydrous isopropanol, then dried at room temperature, in vacuum over sulfuric acid. The yield was 260 g. (55%) of the compound calcium mono-glycine acetylsalicylate.

The product was identical with the compound obtained in Example 1 as shown by the melting point, nitrogen analysis, crystalline structure and other physical and chemical properties.

The amount of isopropanol used in the above example (870 ml.) is much smaller than the one used in my Example 1 (5420 ml.). The reason for this is to prevent the precipitation of the unreacted glycine. Since under the conditions of my process only 1 mole of glycine enters the reaction, when 2 moles of glycine are used (as in the above example) the excess glycine precipitates together with my product, unless the amount of isopropanol is substantially reduced. This also results in the lower yield of the product (55%) as compared with Example 1, (82.5%) where larger amounts of isopropanol are used.

It is clear therefore, that by following the method of the present invention, in which, as described in detail in foregoing paragraphs, the reactants are first substantially in solution and then the reaction product is caused to crystallize by addition of an organic solvent, a novel compound is formed which differs in its chemical and physical properties from the compound obtained by the method of the prior art, in which minimum quantities of solvent are used, generally in the order of 1/30 to 1/60 of the amounts of the present invention and in which method both the reactants and the reaction product are never in solution, except in extremely minor amounts.

The method of the prior art employs 50 ml. of water per about 200 g. of calcium acetylsalicylate. This salt is soluble to the extent of about 1 part in 5 parts of water. Thus, 50 ml. of water will dissolve only 10 g. of the calcium salt leaving about 190 g. or about 95% undissolved. The product of the reaction itself exhibits about the same degree of solubility as calcium acetylsalicylate and consequently more than 95% of it, or practically the entire amount, remains undissolved in the amount of water used in the prior art. In practice, the method used by the prior art consists in converting a mixture of reactants in substantially *solid state* into a reaction product in substantially *solid state*.

In distinct contrast to the above, the method of the present invention consists in converting a mixture of reactants in substantially *liquid state* (in solution) into a reaction product in substantially *liquid state* (in solution).

As a result of these essential differences in the method, the compound of this invention differs from the compound of the prior art in chemical compositions, formula, and chemical and physical properties.

The economic advantage of the compound of the present invention over the prior art should be noted. It is evident that when dealing with drugs such as aspirin the cost factor is of great importance. Aspirin is one of the least expensive and one of the most used drugs at the present time. Being an extremely competitive product, it cannot stand any substantial additional cost due to the use of other components or reactants. In the compound of the present invention, as shown above, only half as much glycine is present as in the compound of the prior art, thus offering a considerable economic advantage over the latter.

Another significant advantage of the compound of the present invention is that its aspirin content is considerably higher that that of the compound of the prior art: 76% vs. 66%. It is obviously most desirable therapeutically as well as practically (in formulating the various dosage forms) to have as high a content of the active ingredient (in the present case, aspirin) as possible. For example, in order to prepare the usual 5 grain (325 mg.) tablet of aspirin with the compound of the prior art, it is necessary to use close to 500 mg. of the compound, since it contains only 66% of aspirin equivalent. This, of course, make it impossible to prepare the standard 500 mg. tablet, since it leaves no room for the necessary inert ingredients, such as binders, lubricants and the like, which the preparation of the tablet requires.

In contrast, with the product of this invention, which contains an equivalent of 76% aspirin, only about 425 mg. of the compound is needed, making the preparation of the standard, convenient size 500 mg. tablet possible.

However, the most important advantage of the new product is its stability. As shown above, calcium monoglycine acetylsalicylate is anhydrous and non-hygroscopic and may be kept at room temperature for 12 months or at 50° for 5 days without any significant rise in the salicylic acid or acetic acid contents. It exhibits high stability.

In contrast, the compound of the prior art described in the U.S. Patent 2,101,867, Example I, rapidly decomposes under the same conditions. This will be apparent from the following Examples 3 and 4.

*Example 3*

199 g. (0.5 mole) of colcium acetylsalicylate were combined with 75 g. (1 mole) of glycine in the presence of 50 g. of water. The mixture remained in the form of a solid. This was stirred for 2 hours and dried in vacuum over sulfuric acid.

The stability of the product was tested by keeping a sample at 50°. It was observed that the sample developed a strong odor of acetic acid within 48 hours at this temperature. After 5 days the sample was analyzed and the salicylic acid content was found to be 5%. This corresponds to 6.5% acetylsalicylic acid and, since the original aspirin content of the compound was 66%, the decomposition was equal to 10% of that content. The rapid formation of free acetic acid and the extensive decomposition of the product show a degree of instability that make the product unsuitable for any practical medicinal applications.

*Example 4*

In this example, as in Example 3, the directions of the prior art given in the U.S. Patent 2,101,867, Example I, were followed with the exception that instead of isolating the product by drying, it was separated with the aid of an organic solvent, ethanol, as directed therein.

199 g. (0.5 mole) of calcium acetylsalicylate were combined with 75 g. (1.0 mole) of glycine in the presence of 50 ml. of water. The mixture remained in the form of a solid. This was stirred for 2 hours, taken up with 750 ml. of ethanol, stirred, filtered, washed with ethanol and dried in vacuum over sulfuric acid.

The stability of this material was tested by keeping a sample at 50°. In the present case, as in the previous, a strong odor of free acetic acid had developed within 48 hours. After 5 days at 50°, the sample was analyzed and found to contain 5% of salicylic acid, corresponding to a 10% decomposition of the original acetylsalicylic acid.

These experiments and tests show that the product of the prior art does not possess sufficient stability for practical medicinal uses.

This invention is limited to a single amino acid, glycine. When the process of this invention was applied to other amino acids, some of which were very closely related to glycine, no compound formation took place. Thus, when an equivalent amount of alpha-alanine, beta-alanine, sarcosine, valine, methionine, taurine and e-aminocaproic acid was substituted for glycine in Example 1, the only product that crystallized out was the original calcium acetylsalicylate. Under the conditions of the method of this invention only glycine undergoes reaction.

This is yet another significant difference between the method of the present invention and the method of the prior art disclosed in the U.S. Patent 2,101,867. By the use of the latter, any amino acid can be made to react with calcium acetylsalicylate to form calcim di-amino acid acetylsalicylate. However, as shown above, compounds of this structure, at least in the case of glycine, are not sufficiently stable for practical purposes. On the other hand, by the use of the method of this invention, a compound of a different structure is obtained, a calcium mono-amino acid acetylsalicylate, which is of excellent stability, in addition to its other advantges of economic and medicinal nature, described above.

The compound of this invention when prepared according to the procedures outlined above is essentially pure, stable material that is both anhydrous and non-hygroscopic. Where the process of this invention is employed so that both the calcium acetylsalicylate and glycine are reacted together in reaction medium made up of the mixed solvent admixture, and the resulting reaction product subsequently isolated by crystallization from the same reaction system, the resulting compound contains minor amounts of free salicylic acid. In general, the percentage of free salicylic acid may vary from 0.05% by weight of the isolated crystalline material (when recrystallized) to as much as about 0.5% or more by weight. Compositions containing free salicylic acid in not over about one percent (1.0%) by weight have been found to be stable over protracted periods of room temperature storage. Crystalline compositions containing substantially in excess of 1.0% by weight of free salicylic acid tend to decompose more readily over protracted periods. Compositions of this invention comprising calcium mono-glycine acetylsalicylate together with not over about 1.0% by weight of salicylic acid are freely soluble in water and their aqueous solutions provide excellent therapeutic compositions that possess effective antipyretic and analgesic activity.

In addition to the previously described high utility of the compound of this invention, this material also exhibits an interesting corollary aspect of utility. It has been found that many other therapeutic compounds such as caffeine, glyceryl o-cresylate (mephenesin), glyceryl guiacolate (guyanesin), barbiturates, theophyllin, steroids and the like, are markedly more soluble in aqueous solution of calcium mono-glycine acetylsalicylate than they are in pure water. Since aspirin is frequently administered together with other drugs (e.g. caffeine, anti-arthritic steroids, antibiotics) this solubizing effect of the compound of this invention facilitates the preparation of many useful combinations of drugs in convenient dosage form, and increases the effectiveness of many drugs.

Ever since the pharmacological properties of aspirin were discovered some sixty years ago a continuous search has been made for a stable derivative thereof exhibiting high and complete water solubility and a rapid rate of dissolution in water. Compounds of aspirin with organic bases, alkali metal and alkaline earth metal salts of aspirin, etc., have been made and tested but all of the resulting compounds have been found to be unsuitable for reasons of the solubility characteristics and/or stability characteristics thereof. The calcium mono-glycine acetylsalicylate prepared in accordance with the teachings of the present invention is a solid, crystalline compound, anhydrous, non-hygroscopic and stable during protracted storage and exhibits high and complete solubility and a rapid rate of dissolution in water.

Having set forth the specific aspects of this invention, it is intended that my invention be limited to the herein-after appended claim.

I claim:

The compound:

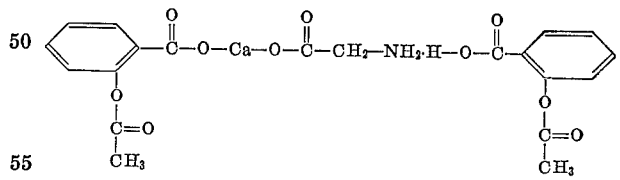

References Cited by the Examiner

UNITED STATES PATENTS 2,101,867  12/1937  Miller et al. _____ 260—480

LORRAINE A. WEINBERGER, *Primary Examiner.*

LEON ZITVER, *Examiner.*

I. R. PELLMAN, *Assistant Examiner.*